Nov. 30, 1965 G. MERZ 3,221,102

TIME-DIVISION MULTIPLEX CONTROL METHOD FOR ELECTRONIC SWITCHING SYSTEMS IN TELECOMMUNICATION, PARTICULARLY TELEPHONE INSTALLATIONS

Filed Dec. 4, 1961

INVENTOR.

G. MERZ

BY Paul Hemminger

Attorney

United States Patent Office 3,221,102
Patented Nov. 30, 1965

3,221,102

TIME-DIVISION MULTIPLEX CONTROL METHOD FOR ELECTRONIC SWITCHING SYSTEMS IN TELECOMMUNICATION, PARTICULARLY TELEPHONE INSTALLATIONS

Gerhard Merz, Rommelshausen, near Waiblingen, Germany, assignor to International Standard Electric Corporation, New York, N.Y., a corporation of Delaware Filed Dec. 4, 1961, Ser. No. 156,726
Claims priority, application Germany, Dec. 8, 1960, St 17,205
5 Claims. (Cl. 179—15)

Figure 1:
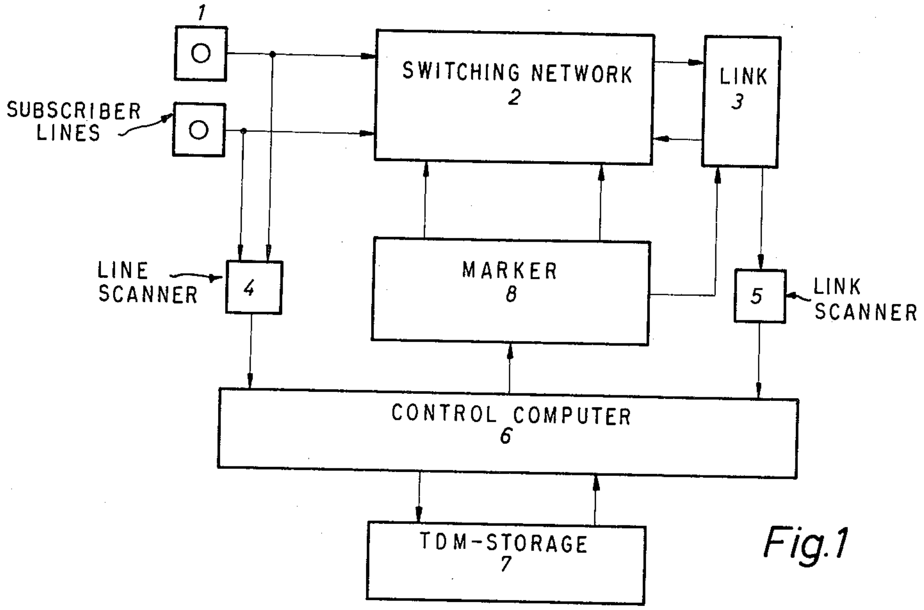

The present invention relates to a time-division multiplex control method for electronic switching systems in telecommunication, particularly telephone installations.

Various types of switching systems employing electronic circuit elements have become known recently. These are mostly systems comprising a switching network with storing properties, that is, by a single application of setting pulses there is established a connection which remains to exist until the connection is released with the aid of release pulses. Such types of switching networks are chiefly controlled by electronic control devices operating in accordance with the time-division multiplex method. In these systems there is available a central control computer by which the individual subscriber's lines, connecting links, etc., are served either in accordance with requirements, or else in a cyclical order of succession according to the so-called time-division multiplex method. To this end there is provided a time-division multiplex storage device, the individual cells of which being respectively assigned to a subscriber's line, a connecting link, etc. These storage cells serve to store an information indicating the state which the subscriber's line, the connecting link, etc., has assumed after the last service rendered by the control computer. In the hitherto conventional types of methods the central control computer is respectively available either to a subscriber or to a connecting link, or to any other unit of the switching system. This method, however, has the disadvantage that both the mode of operation and the construction of the control computer become very difficult to survey.

In order to eliminate these disadvantages the invention proposes to assign to each group of equivalent functional units (subscriber's lines, connecting links, etc.) a time-division multiplex system of its own, with its own computer and with its own storage device and that these systems operate independently of one another in periodically repeated time intervals of a first kind, and that in time intervals of a second kind respectively two of these systems are coupled in such a way to one another, that an exchange of information may be effected between the two computers. It being one prerequisite that the durations of the time positions of the individual systems, which are determined by the time of rotation of one time-division multiplex system and by the number of systems to which a service is rendered thereby, are integer multiples of one another, and that these time-division multiplex systems are controlled synchronously with one another, so that always several short time positions of the one system coincide with one long time position of another system. A further embodiment of the invention is characterized by the fact that the exchange of information is performed preferably in the first short time position which coincides with a long time position, and that in the remaining short time positions, which coincide with the long time position, there is respectively rendered a service to an associated system in a certain order of succession independently of the other time-division multiplex systems. In the remaining time of the long time position, and independently of the remaining time-division multiplex systems, the exchanged information is processed and stored in the system provided with the long time position. During the independent time positions of the system with the short time positions the scanning of the systems is performed together with the scanning of the associated storage cells. The scanned system is identified by the computer in conjunction with a cyclically rotating counter. At the end of one time position, in accordance with a further embodiment of the invention, the information ascertained by the computer of the system with the short time position is then re-stored into the associated cell of the own storage device. In addition thereto it is determined by the computer of the system with the short time position if and by what time-division multiplex system with a long time position there is required an exchange of information. The corresponding information items are transferred by the computer to an associated transfer-storage device where they are stored until being taken over and stored by the computer of the desired time-division multiplex system provided with a long time position upon rendering a service to a free system. In the course of this the information is stored in the storage cell assigned to the just scanned equipment of the system with the long time position. According to a further embodiment of the method according to the invention it is provided that at the beginning of a long time position the information as taken over by the associated cell of the storage device, is retransmitted to the computer of the output system with the short time position, and that there the storage cell and equipment assigned to this particular information is being scanned with a direct access.

Figure 2:
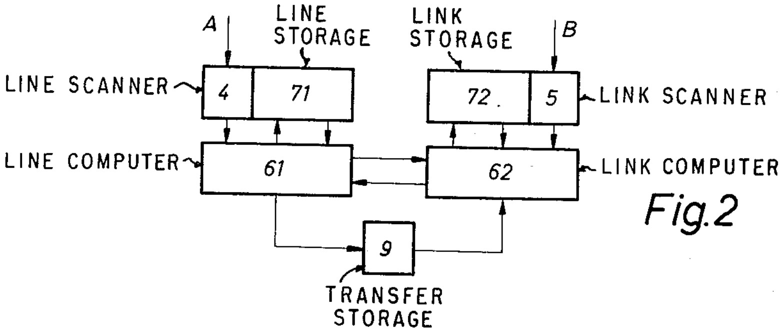
Figure 3:

The method will now be explained with reference to an example shown in FIGS. 1–3 of the accompanying drawings, in which:

FIG. 1 shows the principle construction of a simple type of switching system comprising *n* subscribers having *m* connecting links at their disposal, FIG. 2 shows the construction of the control arrangement according to the invention, and FIG. 3 shows the timing programme for the two parts of the control arrangement.

In the block diagram of FIG. 1, the lines of the subscriber's 1 extend to the switching network 2 via which a calling subscriber may be connected to an idle connecting link 3, or respectively via which a called subscriber is connected to the connecting link which is in connection with the subset of the calling subscriber. A scanning device 4 of the subscriber's lines provides the control computer 6 with information regarding the condition of the individual subscriber loops (open or de-energized or closed and energized). Coupled to the control computer 6 is the time-division multiplex storage 7 in which the information regarding the condition of the individual subscriber's lines and connecting links are stored after having been served by the control computer for the last time. The scanning device 5 supplies information from the connecting link via existing connections. The marker 8 receives the corresponding instructions for establishing or releasing a connection, respectively for applying the audible tones and the calling signal to and for disconnecting them from the control computer 6. The mode of operation of such an arrangement is that the control computer 6, with the aid of the scanning devices 4 and 5, is continuously provided with information indicating the condition and any changes in condition of the subscriber loops or connecting links respectively. The evaluation of this information provides the instructions which are transferred to the marker 8.

In FIG. 2 the control computer 6 and the storage 7 are shown in the way as they are actually divided in accordance with the invention. The scanning device 4, the storage 71 and the computer 61 are assigned to the *n* subscriber's lines, and the scanning device 5, the storage 72 and the computer 62 are assigned to the *m* connecting links. As a connecting member between the parts there is used the transfer storage 9. It will be understood that the scanning of a subscriber's line by the scanning device 4 or respectively of a connecting link by the scanning device 5 is respectively effected in conjunction with the interrogation of the storage cell of the storage 71 or 72 respectively, which is assigned to the respective subscriber's line or the respective connecting link. FIG. 3 shows the timing programme with respect to the sequence of functions. In this FIG. 3 line A is assigned to the subscriber's side, and line B to the side of the connecting link. At the beginning of each time interval TK1 . . . TK*n* of line A there is performed the scanning of one subscriber's line with the aid of the scanning device 4 and the associated storage cell of the storage 71. The address, that is, the number of the subscriber, is supplied by the computer 61. The scanning results from both the line and the storage are fed to the computer 61, and the information newly calculated therefrom, is retransmitted to the storage 71 at the end of the time interval. Analogously the same is applicable with respect to the side of the connecting link with the scanning device 5, the storage 72 and the computer 62.

If the computer 61 during the scanning of a subscriber, recognizes that this subscriber wishes to establish a connection, then the number of this subscriber is transferred to the intermediate storage 9. In this intermediate storage 9 the subscriber's call number is retained until, in the course of the scanning of the connecting links, and within the frame of the timing programme according to FIG. 3B, there will appear an idle connecting link. During the time interval TL, which is assigned to this particular connecting link, the subscriber's call number is transferred from the intermediate storage to the computer 62, and at the end of the time interval, this number is recorded into the storage 72, i.e. into that particular cell which is assigned to the respective connecting link. Accordingly, this subscriber's number is available in the computer 62 at the beginning of each time interval which is assigned to this particular connecting link.

Basically, the connecting links with their associated storage cells are continuously scanned in a cyclical order of succession TL1 . . . TL*m*, in accordance with the timing programme shown in FIG. 3B. After a connecting path has been allotted to a subscriber, this subscriber's call number is available in the computer 62 at the beginning of the time interval which is assigned to the respective connecting link. This number is now directly fed to the computer 61, and it is caused by the latter that both the associated subscriber's line and the cell of the subscriber storage are scanned in a direct access. During the time interval TK there is effected the necessary exchange of information between the computers 61 and 62. Towards the end of the interval TK the new information, as supplied by the computer 61, is re-recorded into the subscriber storage 71, and the coupling between the computers 61 and 62 is eliminated (cancelled). While the computer 62 further processes the received information during the time interval TG the computer 61 performs the scanning of the two further subscribers, the number of which being supplied by a cyclically rotating counter.

This method of coupling two time-division multiplex systems which partly operate independently of one another (e.g., for idle subscribers and idle connecting paths), but which are partly also dependent on one another (on account of connections in the switching network), has the advantage of being easy to survey, and of having an economical construction. In addition thereto, by the temporarily independent operation of the two time-division multiplex systems, it is possible to obtain a substantial saving of time.

The method is in no way restricted to two different time-division multiplex systems, but may also be extended to and used with more than two time-division multiplex systems.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. An electronic switching system comprising at least a first and a second group of functional units, a time division multiplex system individually associated with each of said groups for communicatively interconnecting any of said units, and time division computer means included in each of said individual multiplex systems for providing periodically repeated time intervals which are individual to each of said groups for controlling the units within said groups, said time intervals being determined by the time period of each multiplex system and by the number of units in the associated group, each of said time intervals further being integer multiples of one another so that each of said time intervals coincides once per time period for exchanging information between said interconnected units during the coincidence of time periods.

2. The system of claim 1 wherein each said individual time division multiplex system comprises unit scanner means for periodically scanning the associated units during the time intervals individual to the scanned units to determine switching information, and unit storage means for storing the information, intermediate storage means for transferring said information to another of said individual time multiplex systems during a first portion of coincidence between the time intervals of said individual time division multiplex systems.

3. The system of claim 2 and means for directly accessing the computers of each of said individual time division multiplex systems during said first portion of coincidence.

4. The system of claim 2 wherein said functional units comprise lines and links respectively.

5. The system of claim 4 wherein link storage means are provided for storing said information received from said transfer storage means after operation of the link scanner.

References Cited by the Examiner

UNITED STATES PATENTS

| | | | |
|---|---|---|---|
| 2,584,987 | 2/1952 | Deloraine | 179—15 |
| 2,979,570 | 4/1961 | Brightman | 179—15 |
| 3,015,699 | 1/1962 | Faulkner et al. | 179—18.9 |
| 3,049,593 | 8/1962 | Touraton et al. | 175—15 |

DAVID G. REDINBAUGH, *Primary Examiner*.